(12) United States Patent
Schaefer et al.

(10) Patent No.: US 9,025,718 B2
(45) Date of Patent: May 5, 2015

(54) DIRECT PRODUCTION OF THERMAL ANTINEUTRONS AND ANTIPROTONS

(76) Inventors: Daniel R. Schaefer, Union, OH (US); James M. Snead, Beavercreek, OH (US)

( * ) Notice: Subject to any disclaimer, the term of this patent is extended or adjusted under 35 U.S.C. 154(b) by 536 days.

(21) Appl. No.: 12/398,726

(22) Filed: Mar. 5, 2009

(65) Prior Publication Data

US 2009/0225921 A1    Sep. 10, 2009

Related U.S. Application Data

(63) Continuation-in-part of application No. 12/183,147, filed on Jul. 31, 2008, now abandoned, and a continuation of application No. 11/850,106, filed on Sep. 5, 2007, now abandoned, and a continuation of application No. 11/158,205, filed on Jun. 21, 2005, now abandoned.

(60) Provisional application No. 60/581,884, filed on Jun. 22, 2004.

(51) Int. Cl.
*G21G 1/02* (2006.01)
*G21G 1/06* (2006.01)
*B82Y 99/00* (2011.01)
*B82Y 30/00* (2011.01)
*H05H 3/06* (2006.01)

(52) U.S. Cl.
CPC . *B82Y 30/00* (2013.01); *G21G 1/06* (2013.01); *H05H 3/06* (2013.01); *Y10S 376/913* (2013.01); *Y10S 977/903* (2013.01)

(58) Field of Classification Search
None
See application file for complete search history.

(56) References Cited

U.S. PATENT DOCUMENTS

| | | |
|---|---|---|
| 4,935,623 A | 6/1990 | Knauer |
| 5,248,498 A | 9/1993 | Neumann et al. |
| 5,300,203 A | 4/1994 | Smalley |
| 5,350,569 A | 9/1994 | Coppa |
| 5,356,872 A | 10/1994 | Eidelloth et al. |
| 5,364,568 A | 11/1994 | Pope et al. |
| 5,364,993 A | 11/1994 | Zhang et al. |
| 5,370,855 A | 12/1994 | Gruen |
| 5,372,798 A | 12/1994 | McConnachie et al. |
| 5,466,430 A | 11/1995 | Castleman, Jr. et al. |

(Continued)

FOREIGN PATENT DOCUMENTS

| | | | |
|---|---|---|---|
| WO | WO 93/15768 | 8/1993 | |
| WO | WO-2005014479 A2 * | 2/2005 | ............ C01B 35/10 |

OTHER PUBLICATIONS

Bothe et al., "The absorption of thermal neutrons in carbon", Zeitschrift fuer Physik, vol. 122, No. 9-12, p. 749-755 (1944).*

(Continued)

*Primary Examiner* — Johannes P Mondt
(74) *Attorney, Agent, or Firm* — Thompson Hine LLP

(57) ABSTRACT

A method for obtaining free thermal antineutrons within the cage-like structure of a fullerene molecule comprising irradiating the fullerene molecule with free neutrons causing free neutrons to be trapped within the fullerene molecule wherein the trapped neutron oscillates between the neutron and antineutron states. A method for producing antiprotons comprising irradiating a fullerene molecule with free neutrons and trapping the neutrons within the fullerene molecule such that the neutrons oscillate between neutron and antineutron states and in the antineutron state decay and produce antiprotons. A method for producing antiprotonic x-ray cascade spectra.

20 Claims, 10 Drawing Sheets

(56) References Cited

U.S. PATENT DOCUMENTS

| | | | |
|---|---|---|---|
| 5,640,705 | A | 6/1997 | Koruga |
| 2002/0037066 | A1 | 3/2002 | Schaefer et al. |
| 2004/0162457 | A1* | 8/2004 | Maggiore et al. ............... 600/1 |
| 2007/0273308 | A1* | 11/2007 | Fritzler et al. ............... 315/505 |

OTHER PUBLICATIONS

Firestone et al., LBNL Isotope Project—LUNDS Universitet, WWW Table of Radioactive Isotopes, version 2.1, Feb. 1999, Nitrogen (Z=7).*

Firestone et al., LBNL Isotope Project—LUNDS Universitet, WWW Table of Radioactive Isotopes, version 2.1, Feb. 1999, Carbon (Z=6).*

Snow, W.M., "Toward an improved search for neutron-antineutron oscillations", Nuclear Instruments and Methods in Physics Research A 611, pp. 144-148 (2009).*

Ban et al., "Direct Experimental Limit on Neutron-Mirror-Neutron Oscillations", Physics Review Letters 99, 161603-1 through 161603-4, Oct. 19, 2007.*

Serebrov et al., "Experimental search for neutron-mirror neutron oscillations using storage of ultracold neutrons", Physics Letters B 663, 181-185 (2008).*

Braun et al., "Raman spectroscopy of the effect of reactor neutron irradiation on the structure of polycrystalline C60", Letters to the Editor, Carbon, vol. 43, pp. 855-894 (2005).*

Ignatovich, V.K., *The Physics of Ultracold Neutrons*, Clarendon Press, Oxford, ISBN 0-19-851015-2, pp. 85-86, 168-169, and 304-305 (1990).

Golub, R. et al., *Ultra-Cold Neutrons*, Adam Hilger, ISBN 0-7503-0115-5, pp. 19-38, 173-191, and 216-218 (1991).

Rakovic, M., *Activation Analysis*, CRC Press, pp. 191-194 (1970).

Lyon, Jr., W.S., *Guide to Activation Analysis*, D. Van Nostrand Company, Inc., pp. 131-133.

*Handbook of Chemistry and Physics, a Ready-Reference Book of Chemical and Physical Data, Forty-Third Edition*, The Chemical Rubber Publishing Co., pp. 450-469, 472, 473, 478-483, 488, 489, 494, 495, 500, 501 (1961).

"Beta Emitters by Half-Life and Energy," *Nucleonics*, No. 40—Nuclide Properties (Feb. 1961).

Kosvintsev, Y., et al., "Possible Use of Wall Traps and Magnetic Traps of Ultra-Cold Neutrons for Measuring the Lifetime of the Free Neutron," *Instruments and Experimental Technique*, vol. 20, No. 1, pt. 1, pp. 43-45 (Jan.-Feb. 1977).

Jimenez-Vazquez, H.A., et al., "Hot-atom incorporation of tritium atoms into fullerenes," *Chemical Physics Letters*, 229, pp. 111-114 (Oct. 21, 1994).

Percival, P.W., et al., "The structure of $C_{60}Mu$ and other fullerenyl radicals," *Chemical Physics Letters*, vol. 196, No. 3,4, pp. 317-320 (Aug. 14, 1992).

Niedermayer, C., et al., "Simultaneous observation of muonium and multiple free radicals in muon-implated $C_{70}$," *Physical Review B*, vol. 47, No. 16, pp. 10923-10926 (Apr. 15, 1993).

Estreicher, S.K., et al., "Stable and metastable states of $C_{60}H$: buckminsterfullerene monohydride," *Chemical Physics Letters*, vol. 196, No. 3,4, pp. 311-316 (Aug. 14, 1992).

Huffman, P.R. et al., "Magnetic trapping of neutrons," *Nature*, vol. 430, pp. 62-64 (Jan. 6, 2000).

Kikuchi, K. et al., "Encapsulation of Radioactive [159]Gd and [161]Tb Atoms in Fullerene Cages," J. Am. Chem. Soc., No. 116, pp. 9775-9776 (1994).

Curl, R.F. et al., "Fullerenes," *Scientific American*, pp. 54-63 (Oct. 1991).

Gribbin, J., "Famous for 14 minutes, 49 seconds," *New Scientist*, pp. 41-44 (Mar. 13, 1993).

Schreckenbach, K., *Search for Exotic Phenomena with Slow Neutrons*, pp. 151-162 (1990).

*Handbook of Tables for Applied Engineering Science*, The Chemical Rubber Co., p. 390 (1970).

Dubbers, D., "Search for Neutron-Antineutron Oscillations at ILL," pp. 369-375, presented at Recontres de Moriond workshop on tests of fundamental laws in physics in France (Jan. 1991).

Bellotti, E., "New Particle Searches and Exotic Phenomena—Part 2," *Nuclear Physics A527*, pp. 809c-816c (1991).

Lindstrom, R.M. et al., "Analytical Applications of Cold Neutron Capture and Opportunities for Nuclear Physics," presented at Proc. Int. Symp. Capture Gamma-Ray Spectrosc. Relat. Top, 8th Meeting, pp. 955-961 (1993).

Krishnaswamy, M.R. et al., "The K.G.F. Nucleon Decay Experiment," *Fortschritte Der Physik, Progress of Physics*, pp. 955-961 (1983).

Lindstrom, R.M. et al., "Measuring Hydrogen by Cold-Neutron Prompt-Gamma Activation Analysis," *Journal of Radioanalytical and Nuclear Chemistry*, Articles, vol. 180, No. 2, pp. 271-275 (1994).

Neumann, D.A. et al., "Coherent Quasielastic Neutron Scattering Study of the Rotational Dynamics of $C_{60}$ in the Orientationally Disorderd Phase," *Physical Review Letters*, vol. 67, No. 27, pp. 3808-3811 (Dec. 30, 1991).

Lawrence, K.L.S. et al., "Fullerene Radiopharmaceuticals? High-Flux Neutron Irradiation Study of $C_{60}$," *Electrochemical Society Proceedings*, vol. 95-10, pp. 66-71 (May 1995).

*CRC Handbook of Physics and Chemistry, 47th Edition*, The Chemical Rubber Co., p. F-126 (1966).

Moses, A.J., *Nuclear Techniques in Analytical Chemistry*, Pergamon Press, pp. 50-60, and 118-127 (1964).

Lyon, W.S., *Guide to Activation Analysis*, D. Van Nostrand Company, Inc., pp. 131-133 (1964).

"Chemically Modified Fullerenes," *Physics & Chemistry of Fullerenes*, pp. 190-192, Reprint collection edited by P.W. Stephens.

Hawkins, J.M. et al., "Crystal Structure of Osmylated $C_{60}$: Confirmation of the Soccer Fall Framework," The American Association for The Advancement of Science, pp. 193-194 (1991).

Fagan, P.J. et al., "The Chemical Nature of Buckminsterfullerene ($C_{60}$) and the Characterization of a Platinum Derivative," The American Association for The Advancement of Science, pp. 195-196 (1991).

Suzuki, T. et al., "Systematic Inflation of Buckminsterfullerene $C_{60}$: Synthesis of Diphenyl Fulleroids $C_{61}$ to $C_{66}$," The American Association for The Advancement of Science, pp. 197-199 (1991).

Braun, T. et al., "Endohedral incorporation of argon atoms into $C_{60}$ by neutron irradiation," *Chemical Physics Letter*, 237, pp. 443-447 (1995).

Ignatovich, V.K., *The Physics of Ultracold Neutrons*, Clarendon Press, Oxford, U.K., (ISBN 0-19-851015-2) pp. 1-33 (1990).

Lewis, R.A. et al., "Antiproton-Boosted Microfission," *Nuclear Science and Engineering*, vol. 109, pp. 411-415 (Dec. 1991).

Chen, B. et al., "Neutron Yields and Angular Distribution Prodcued in Antiproton Annihilation at Rest in Uranium," *Physical Review C.*, vol. 45, No. 5, pp. 2332-2337 (May 1992).

Vergano, D., "Gee-whiz nuclear-fusion gadget surprises scientists with its simplicity," *USA Today*, p. 8D (Apr. 28, 2005).

The National Nuclear Data Center website: http://www.nndc.bnl.gov/nndc/nudat/.

Forward, R.L. et al., *Mirror Matter Pioneering Antimatter Physics*, ISBN 0-471-62812-3 (1988).

*The Properties of Natural and Synthetic Diamond*, edited by J.E. Field, Academic Press, ISBN 012-255352-7, Library of Congress Catalog No. 64-15736.

*The Properties of Diamond*, edited by J.E. Field, Academic Press, ISBN 0-12-255350-0, Library of Congress Catalog No. 77-94296 (1979).

Mann et al., *Int. J. Modern Phys.*, vol. 18 (22), pp. 3821-3840 (2003).

Kuo et al., *Physical Review Letters*, vol. 45 (2), pp. 93-96 (1980).

Nachtmann, O., "Elementary Particle Physics," Springer Verlag, Berlinp. 184 (1990).

Klos et al., "Neutron density distribution from antiprotonic [208]Pb and [209]Bi atoms" Phys. Rev. C 76, 014311 (2007) (13 pages) (Jul. 25, 2007).

Squires, G.L., *Introduction to the Theory of Thermal Neutron Scattering*, Cambridge University Press, pp. 1-5 (1978).

\* cited by examiner

Summary of shifts and widths measured for 208Pb

X-ray cascade spectrum of irradiated C70 without 209Bi present and a photopeak at about 75Kev X-ray cascade spectrum of irradiated C70 without natural Pb present

DIRECT PRODUCTION OF THERMAL ANTINEUTRONS AND ANTIPROTONS

CROSS REFERENCE TO RELATED APPLICATIONS

This application is a continuation-in-part of and claims priority to U.S. application Ser. No. 12/183,147 filed Jul. 31, 2008, which is a continuation of U.S. application Ser. No. 11/850,106 filed Sep. 5, 2007, which is a continuation of U.S. application Ser. No. 11/158,205 filed Jun. 21, 2005, which in turn claims priority to provisional application Ser. No. 60/581,884 filed Jun. 22, 2004.

BACKGROUND OF THE INVENTION

This invention disclosure relates to a new method for the direct production of thermal antineutrons and thermal antiprotons from thermal neutrons. The process of neutron-antineutron oscillation produces the antineutrons. The neutron-antineutron oscillation process produces thermal antiprotons when the antineutrons decay.

The process of neutron-antineutron oscillation is a prediction of grand unification models in gauge field theories. Ignatovich[1] and Golub[2] discuss the theory behind this prediction. Stated plainly, the theory predicts that a neutron that is cold enough to be contained by the interior walls of a suitable vessel may oscillate into an antineutron without violating any quantum conservation laws. Ignatovich[1] also predicts that the probability of an oscillation is proportional to the number of reflections of the cold neutron from the walls of the vessel. No current art demonstrates the ability to cause neutron-antineutron oscillation to occur. The applicants demonstrate that the art in this disclosure represents the first reduction of neutron-antineutron oscillation theory into practice.

Published Application 2002/0037066 discloses that fullerene molecules, such as $C_{70}$, trap free neutrons inside the internal cavity of the fullerene molecule. The present disclosure is based on the discovery that neutrons trapped inside fullerene molecules undergo neutron-antineutron oscillation. In the previous disclosure, the applicants referenced neutron-antineutron oscillation only as a theoretical possibility.

The applicants have found that the number of neutron reflections per second per trapped neutron, as produced by this art, is similar to the number of reflections that Ignatovich[1] predicts will produce a neutron-antineutron oscillation. Once a trapped neutron oscillates into an antineutron, the same number of reflections presumably returns the antineutron to the neutron state.

In other words, once the interior cavities of $C_{70}$ fullerene molecules trap a population of neutrons, approximately 50% of the population actually exists in the antineutron state at any subsequent time.

The internal cavities of the fullerene molecules contain the neutrons and antineutrons until the neutrons and antineutrons decay or until the application of other current art forces their release. U.S. Published Application 2002/0037066 discusses this current art. If the application of current art does not first release them, the neutrons trapped in the fullerene molecules decay by the process of beta decay. The resultant beta decay radiation has a characteristic half-life of 10.25 minutes as the previous patent disclosure demonstrates.

The trapped antineutrons decay by positron decay. Positrons are electrons with a positive electrical charge. In other words, positrons are antielectrons. Positrons are distinguishable from beta particles because they will annihilate with electrons. The result is a distinctive gamma energy emission at 511 KeV. A gamma spectrometer readily detects and identifies this gamma emission.

The applicants' research demonstrates that these annihilation energy emissions exhibit a 10.25-minute decay half-life. This is the same half-life as the trapped neutrons demonstrated in the previous disclosure. The accepted half-life of a free neutron is 10.25 minutes. Antineutrons, presumably, also have a 10.25-minute half-life.

The applicants also conducted an additional and independent series of experiments to confirm the results claimed in Published Application 2002/0037066 and in this application. Briefly, these experiments demonstrate directly the presence of antiproton emissions from $C_{70}$ after the $C_{70}$ is irradiated by thermal neutrons. These experiments are described in detail herein in the section headed "Independent Experimental Confirmation".

SUMMARY OF THE INVENTION

The source of the neutrons that irradiate the $C_{70}$ in all of the experiments discussed in this disclosure was the nuclear reactor at the Ohio State Reactor Laboratory in Columbus Ohio; however, the source of neutrons is not limited thereto. Applicants utilized the Ohio State reactor only for convenience. Other sources of neutrons, in particular free neutrons, would be apparent to one of ordinary skill in the art.

In accordance with the invention, each free neutron in a population of free neutrons trapped inside fullerene molecules oscillates between the neutron and antineutron states. This oscillation occurs at a rapid rate so that a significant percentage of the population is in the antineutron state at any given time. The predictions of Ignatovich[1] and others suggest that 50% of the trapped neutrons are in the antineutron state at any given time.

One manifestation of this invention is a process that easily and economically converts free thermal neutrons into free thermal antineutrons. These antineutrons may decay to positrons, antiprotons, and neutrinos. The antiprotons thus produced have low thermal energy. A method that directly converts neutrons to antineutrons is new art. The ability of neutrons to undergo this conversion is a heretofore-undemonstrated prediction of theoretical physics. The trapping of the antineutrons is new art. Current art permits collection and storage of thermal neutrons but not the trapping and storage of antineutrons.

Another manifestation of the invention is a fullerene containing a trapped antiproton.

Another manifestation of the invention is a fullerene having a 511 KeV Ann. γ radiation with a half-life of 10.25 minutes+/−2 minutes.

Another manifestation of the invention is a method for producing antiprotons.

Current Art

Ignatovich[1] and Golub[2] both discuss the possibility that neutrons may oscillate into antineutrons. This is a prediction of grand unification models in gauge field theories. As long as the electrostatic charge of a neutron is identically zero, this oscillation violates no quantum conservation law. It does violate one experimental "law," the conservation of baryon number. There is no theoretical basis for this "law." No published peer-reviewed observations violate it.

A characteristic of cold neutrons exploited by current art is their ability to reflect from solid surfaces. Ignatovich[3] and Golub[4] as well as Kosvintsev[5] discuss this phenomenon. It allows the capture of neutrons inside a vessel. The publication date of Kosvintsev[5], January-February 1977, illustrates that this art is not new. Further, Ignatovich[1] proposes that, in theory; neutron-antineutron oscillation is detectable in such an experiment. Ignatovich[1] proposes that the probability of occurrence of neutron-antineutron oscillation is a function of the number of neutron reflections from the vessel walls.

The probability of occurrence, according to Ignatovich[1], is roughly one oscillation for every $10^{13}$ reflections. The detection of neutron-antineutron oscillation may be a simple matter of filling a suitable vessel with enough cold neutrons so that the number of reflections raises the probability of an oscillation to near unity. Once a neutron oscillates into an antineutron state, it may annihilate with a neutron, or it may decay. It may also oscillate back to a neutron. The antiproton resulting from antineutron decay would annihilate with a proton. Appropriate instrumentation would detect and identify either neutron-antineutron or proton-antiproton annihilation events through the unique high-energy gamma signature of each reaction.

Ignatovich[1] and Golub[2] also discuss the technical problems that have prevented positive experimental results to date. In current art, the numbers of reflections occurring before all the neutrons decay or atomic nuclei capture them are orders of magnitude less than the calculated number required. Hence, the invention in this disclosure is needed to establish circumstances where a sufficient number of reflections can occur.

Fullerene molecules are a third allotrope of carbon. Fullerenes usually have the form of hollow spheroids or long hollow tubes closed by hemispherical ends. All fullerenes are dense shells of carbon atoms surrounding an interior cavity. Fullerenes exhibit a surprising variety of phenomena, from ferromagnetism to superconductivity. Other carbon allotropes do not exhibit these phenomena.

One novel behavior that fullerenes exhibit is the ability to trap or adduct a variety of chemical species inside their internal cavities. Both peer reviewed and popular literature have widely reported this behavior. The only requirement seems to be that the internal cavity of the fullerene is larger than the adducted specie. The chemical specie forms an internal adduct with the fullerene when it is inside the cavity. Either it bonds to the internal surface of the fullerene or it moves freely within the confines of the cavity.

Less widely reported is the ability of fullerene molecules to form internal adducts with subatomic particles. Niedermayer[6] and Percival[7] discuss this phenomenon observed in both $C_{60}$ and $C_{70}$. The fullerene molecules are able to form internal adducts with muons in the form of muonium. Percival[7] states that the muonium appears to be a "non-bonded muonium inside the cage." Niedermayer[6] states, "The calculations of Percival and Wlodek indicate that muonium is stabilized in the interior of the $C_{60}$ at approximately the center of the molecule." The incident muons in both papers are quite energetic at 4 MeV. The fullerenes still trap 25% of these incident muons as muonium adducts. The applicants infer from this that the trapping mechanism, what ever it may be, is robust.

Estreicher[8] calculated the existence of a deep energy well at the center of a $C_{60}$ fullerene molecule when the adducted specie is a simple hydrogen atom. Jimenez-Vasquez[9] demonstrated experimentally that $C_{60}$ fullerene molecules form internal adducts with tritium atoms. This partially confirms Estreicher[8]. Jimenez-Vasquez[9] did not confirm that the tritium adduct was at the center of the $C_{60}$ fullerene. The Jimenez-Vasquez[9] tritium may bond to the interior surface of the $C_{60}$ molecule. The applicants consider this unlikely because the muons of Niedermayer[6] and Percival[7] only bonded to the exterior of the $C_{60}$ and $C_{70}$ fullerene molecules. The muonium adducts, which mimic hydrogen atoms, were internal, and were not bonded to the wall of the fullerene molecule. Huffman[10] demonstrates macroscopic containers that trap neutrons, also an electrostatically neutral specie with a nuclear magnetic dipole moment, by the neutron's own magnetic field. The magnetic field of the neutron is what prevents low energy neutrons from penetrating solid surfaces. The applicants believe this same mechanism traps muonium, simple hydrogen, and tritium in the center of fullerene molecules. Like neutrons, they are all electrostatically neutral and they all have magnetic fields.

In accordance with the invention, the internal surfaces of fullerene molecules should produce the same behavior in cold neutrons and cold antineutrons as the cold neutron behavior produced by the internal surfaces of the macroscopic graphite vessels described by Ignatovich[3], Golub[4], and Kosvintsev[5]. Both macroscopic graphite vessels and fullerene molecular "vessels" are made of densely packed carbon atoms. The nuclei of carbon atoms have a very low probability of neutron capture. This property of carbon nuclei reduces the chance that the process of neutron capture by the carbon nuclei in the walls of a vessel will remove free neutrons from the cavity of either vessel.

The interior cavities of $C_{70}$ molecules seem to be superior to graphite vessels in this respect. The work of Estreicher[8] indicates that the cavity of a fullerene molecule may hold an interior free neutron further away from the nuclei of the carbon atoms than graphite does. In a graphite vessel, the same free neutron could approach the carbon atoms more closely. This increases the chances that the carbon nuclei of a macroscopic graphite vessel would capture a free neutron inside the vessel.

Each neutron trapped inside a fullerene will see the requisite number of reflections, about $10^{13}$ as calculated by Ignatovich[1], approximately once each second. This is due to the tiny diameter of the internal cavity of the fullerene molecule, about 3 angstroms, and the thermal velocity of a neutron, about 2700 meters/second, at room temperature.

The estimate of $10^{13}$ reflections per second is conservative. As discussed already, Niedermayer[6] and Percival[7] suggest that the muonium does not have freedom to move about the entire internal cavity. It is restricted to "near" the center of the cavity. If this restriction applies to neutrons, they also have an even smaller diameter to cross. Thus, their rate of reflection may be much higher than the estimate. This raises the probability of an oscillation accordingly.

As described in U.S. Published Application 2002/0037066, fullerene molecules containing a population of trapped free neutrons exhibit beta particle emissions with a decay half-life of 10.25 minutes. This half-life is due to the beta decay of the trapped free neutrons. If the population of trapped free neutrons oscillates between the matter and antimatter state as Ignatovich[1] and Golub[2] predict, the fullerene molecules will also emit electron-positron annihilation gamma energy (Ann. γ) with a half-life of 10.25 minutes. The applicants have repeatedly detected this gamma emission and measured its half-life. The Ann. γ emission has both the predicted energy, 511 KeV, and the predicted half-life, 10.25 minutes.

The beta decay of neutrons does not release enough energy to create positrons. The creation of positrons requires a minimum of 1.022 MeV regardless of the process. Free neutron beta decay releases only 0.782353 MeV. Neutron-antineutron oscillations produce positrons directly by positron decay of antineutrons as well as by numerous secondary processes.

Many processes that occur subsequent to a proton-antiproton annihilation produce the electron-positron, Ann. γ emission observed in this invention. They all require the decay of an antineutron as the initial process. The antineutron decay process has a half-life of 10.25 minutes. All the subsequent processes producing electron-positron Ann. γ emissions that result from an antineutron decay are virtually instantaneous by comparison. As a result, these subsequent Ann. γ emissions will also appear to have a 10.25-minute half-life.

If fullerenes do not form internal adducts with neutrons, the irradiation of pure fullerenes by neutrons will produce neither beta decay events nor Ann. γ events with 10.25-minute half-lives. Detection of only beta decay radiation with a 10.25-minute half-life indicates formation of internal neutron adducts as was documented in the U.S. Published Application 2002/0037066. Detection of both the beta decay and the electron-positron Ann. γ with 10.25-minute half-lives indicates that both adducted neutrons and antineutrons due to neutron-antineutron oscillations are present in the fullerenes.

U.S. Published Application 2002/0037066, discusses the liberation of trapped neutrons from the interiors of fullerene molecules. Briefly, any of a number processes that release a neutron from the fullerene molecule will also accomplish this result for the antineutrons.

It is also possible to form a beam of fullerene molecules containing trapped neutrons and antineutrons in a particle accelerator. Once the accelerator forms the beam, it can direct the beam onto a thin membrane of metal or ceramic. That will stop the fullerenes but not the neutrons and antineutrons. As noted by the earlier patent application, this art permits the creation of a uniform beam of neutrons and antineutrons at energies above those available in natural nuclear reactions. The invention in this current disclosure is that these techniques create a uniform beam of mixed neutrons and antineutrons. The applicants are unaware of any other art that can produce a uniform beam of high-energy neutrons and antineutrons.

DETAILED DESCRIPTION

Figure 1:
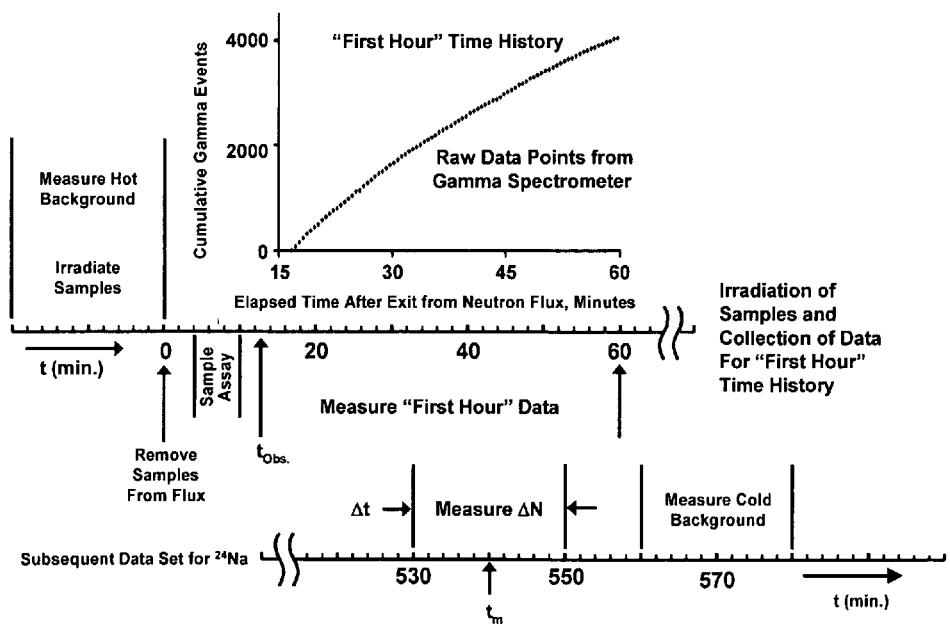
FIG. 1 illustrates a timeline for the experimental procedure.

The applicants offer the following experimental procedure and results as substantial evidence of the reality of the invention in this disclosure. The applicants do not intend that this demonstration in any way constrains the claims for the invention in this disclosure. Likewise this demonstration does not restrict or define the applications of the invention. This demonstration is merely one instructive and explanatory application of the invention in this disclosure.

The results produced by this experiment completely conform to the predictions of Ignatovich[1] and Golub[2]. The experimental results are unprecedented. These experimental results have no other plausible explanation that conforms to any peer-reviewed, published predictions.

General Description of the Experimental Procedure that Demonstrates the Invention Neutrons decay through the release of beta particles. Antineutrons decay through the release of positrons. The decay half-life of a population of free neutrons is 10.25 minutes. The presumption is that the decay half-life of a population of antineutrons is also 10.25 minutes.

While the beta particles do not further interact to produce additional gamma emissions, due to the relatively low energy of the beta particle released from a decaying neutron, the positrons annihilate with electrons very shortly after their emission from the decaying antineutrons, to produce a well-characterized gamma ray of 511 KeV. Beta particles are directly detectable by a beta particle counter while the positron emission is detectable by its 511 KeV gamma ray emission with a gamma spectrometer.

Counting beta particle emissions from the sample as a function of time and then performing an analysis of this data to determine that the half-life of the measured beta particle emissions is 10.25 minutes will determine the presence of a population of free neutrons in a sample of fullerenes. Other radioactive emitters in the sample, should they exist, can also emit detectable beta particles. Although these beta particles are of different energies, the beta counter only detects a beta particle and not its energy. Hence, a mathematical process called "data stripping," which has been used widely for many years, will isolate and remove the counted beta particles from non-neutron sources. This results in a reduced data set containing only "remnant" beta events. Determination of the half-life of these events will identify their source.

In a like manner, the presence of a population of free antineutrons in a fullerene sample can be determined by counting, as a function of time, the gamma ray events with the specific 511 KeV gamma ray energy corresponding to positron-electron annihilation. A gamma spectrometer counts these events. Other radioactive emitters in the sample, should they exist, can emit positrons or other high-energy particles that result in the production of positrons and produce positron-electron annihilation gamma photons at 511 KeV. As with the analysis of the beta particle data, the application of the data stripping process will isolate and remove the counted annihilation events from non-antineutron sources. This results in a reduced data set containing only remnant 511 KeV gamma ray events that are not due to contaminant or background emissions. A simple analysis of these data will determine the half-life of their source.

U.S. Published Application 2002/0037066 discussed the application of this process to the detection of the decay of a population of free neutrons. In this demonstration, neutrons first irradiate one sample of fullerenes. The subsequent 511 KeV gamma ray annihilation energy measurements and data analyses demonstrate that a sizable remnant of gamma ray events exists. The half-life of the source of this radiation corresponds to, within experimental error, the 10.25-minute half-life of the antineutron.

Detailed Description of the Experimental Procedure that Demonstrates the Invention I. Nomenclature $BG_{Cold}$=the rate of background radiation events with the a cold reactor $BG_{Hot}$=the rate of background radiation events with the reactor at the power setting of the experiment $N_{Calc.}$=the calculated cumulative number of decay events at any time, t, where $t_{Obs.} < t < 60$ minutes $N_I$=the initial abundance of the emitter responsible for "remnant data"

$N_{Na}$=the abundance of $^{24}$Na in the sample, the derivative is the intensity of radiation due to $^{24}$Na decay $N_{NCalc.}$=the normalized value of $N_{Calc.}$ $N_{NObs.}$=the normalized value of $N_{Obs.}$ $N_{Obs.}$=the observed cumulative number of remnant decay events at any time, t, where $t_{Obs.} < t < 60$ minutes t=the time after the samples leave the neutron flux of the reactor where $t_{Obs.} < t < 60$ minutes $t_m$=the time a "subsequent data set" is measured to facilitate the "data stripping" process, $t_m > 60$ minutes $t_{Obs.}$=the time when the observation of cumulative events begins $t_{1/2}$=the decay half-life of a radioisotope $\Delta N$=the number of observed decay events occurring in a given finite time step, $\Delta t$ $\Delta t$=the length of any finite time step used to calculate decay rates All times are in minutes. All rates are in events per minute. $C_{70}$ is the notation for the weight of the fullerene molecules that this specific experiment uses. The applicants claim the properties demonstrated for $C_{70}$ for other weights of fullerene. $C_x$ is the more general notation.

II. Neutron Irradiation of Fullerenes

The Ann. γ events, if due to antineutron decay, are only distinguishable from other sources by their half-life. Thus, to demonstrate the invention, the applicants take great care, in part through the purchase of high-purity samples, to exclude contaminants from the fullerene samples in this demonstration. The most frequent source of the applicants fullerene samples is Materials and Electrochemical Research Corporation (MER Corp.), 7960 South Kolb Road, Tucson, Ariz. 85706, Phone: 520.574.1980, Fax: 520.574.1983, MERCORP@MERCORP.COM. The applicants buy material with the catalog number MR7SB.

The applicants discard fullerene samples containing contaminants, detectable by a gamma spectrometer with neutron activation half-lives between 2.25 and 60 minutes. This insures that any contaminant emitter in the fullerenes has a half-life separated by a factor of at least 4.6 from the 10.25-minute half-life associated with free neutron or free antineutron decay.

The original source of the neutrons in this demonstration is not important to the invention. In order to demonstrate this invention, the applicants employed neutrons produced in a nuclear reactor. This source is inexpensive and it supplies a high flux of neutrons, approximately $5 \times 10^{13}$ neutrons per square centimeter per second.

The neutron irradiation of the fullerene sample is similar to a neutron activation experiment. The neutron irradiation of the fullerene sample occurs in a high flux location in a nuclear reactor. The sample irradiation lasts for a period appropriate to the half-life of free neutrons. Typical exposure times are 5 to 15 minutes. The reactor power is set as close to the maximum as circumstances permit to produce as many neutrons as possible. At the Ohio State Reactor Laboratory, the location where this demonstration occurred, the maximum reactor power is 500 Kilowatts. The measurement of the background radiation level, $BG_{Hot}$, for the gamma spectrometer occurs while the reactor is irradiating the fullerene sample. The data reduction that demonstrates the presence of the Ann. γ requires this background measurement.

Transfer of the fullerene sample from the reactor vial into a clean, un-irradiated vial occurs immediately after removal of the vial containing the fullerene sample from the reactor. This insures that the vial does not contribute to any observed radiation. Sealing the new vial insures that no volatile or gaseous species such as $^{41}$Ar leaks out of the vial and mimics the decay of some non-existent specie.

III. Data Collection

Once the neutron irradiation of the fullerene sample provides a population of trapped neutrons and antineutrons inside the internal cavities of the fullerenes, data are collected. The purpose of these data is two-fold. First, it is necessary to identify and remove all activity that is due to background emissions and neutron-activated contaminant emissions from the raw data. Second, any residual activity must conform to the results predicted by Ignatovich[1] and Golub[2]. The procedures in this section collect all the data needed to satisfy these two purposes.

After the transfer of the fullerene sample to a new vial, the procedure assays the activated contaminants in the fullerene sample with the gamma spectrometer to insure that there are no observable contaminants with half-lives between 2.25 and 60 minutes. In the actual experiments, the typical contaminants are only $^{24}$Na ($t_{1/2}$=897.54 minutes), $^{28}$Al ($t_{1/2}$=2.2414 minutes), and $^{41}$Ar ($t_{1/2}$=109.61 minutes). Some experiments exhibit only one or two of these contaminants. The fullerene sample in this demonstration exhibited all three contaminants.

The fullerene sample is not disturbed again for the rest of the experiment once it is in the gamma spectrometer. Movement will change the sample-to-detector geometry. This can affect the observed decay rate and corrupt the data.

This procedure insures that the half-lives of the activated species are different enough from each other and from the half-life of free antineutrons that a technique known as "data stripping" is applicable. This technique is an accepted data reduction procedure for neutron activation experiments. Rakovic[11] and Lyon[12] describe it in detail. The method provides a way to separate the data from two or more emitters when the only observable difference between the emitters is their respective half-lives. FIG. 1 is the timeline of a typical experimental procedure.

Simply waiting for a minimum of 11.25 minutes after removing the fullerene sample from the reactor and before collecting any data other than the contaminant assay effectively removes any influence from activated $^{28}$Al. In this time, five $^{28}$Al half-lives, 97% of any $^{28}$Al present in the fullerene sample will decay. Only about half of the trapped neutrons are lost. The influences of $^{24}$Na and $^{41}$Ar, by virtue of their longer half-lives, are virtually unaffected.

The first 11.25 minutes after removal of the fullerene sample from the thermal neutron flux allow time to transfer the fullerene sample to a clean, un-irradiated vial. The gamma spectrometer also assays the activated contaminants in the fullerene sample during this time.

After the vial transfer, the assay, and the delay to eliminate any emissions from $^{28}$Al, one records the cumulative activity of the sample continuously for 48.75 minutes or until t=60 minutes, whichever comes first. The applicants refer to these 48.75 minutes of data as the "first hour" time history. The first hour time history is simply the total number of 511 KeV Ann. γ events observed since $t_{Obs}$. One records this cumulative total at 30-second time steps. The start of the first hour time history of cumulative activity is $t_{Obs.}$, the time when the observation of cumulative events begins. The first hour time history ends one hour after the fullerenes exit the neutron flux.

Note that in the sample data presented in the charts, the first hour data collection actually began at 17.5 minutes. The times quoted above are the ideal times. In real world experiments, the steps of transferring the fullerene sample to a clean vial and the contaminant assay sometimes take longer than planned. Even though the trapped neutron/antineutron population continued to decay during the additional 6.25 minutes, the results were in excellent agreement with theory. Regardless of when t=$t_{Obs.}$, the first hour data collection ends at t=60.

"Normalization" of the cumulative total in the first hour time history or any other decay data in this disclosure means that the total number of events recorded at each time step is divided by the total number of counts in the final time step of the data.

51.25 minutes after t=0, five neutron half-lives, 97% of the neutrons present at t=0 are gone. Effectively, only the $^{24}$Na, $^{41}$Ar and the $BG_{Hot}$ background are detectable by the gamma spectrometer. The assumption is that the same slightly elevated background radiation level due to the reactor operating at full power is still present until the first hour time history of cumulative activity is complete. After this time, the assumption is that the background radiation is $BG_{Cold}$, the background activity with a cold reactor. 540 minutes after t=0, equal to five $^{41}$Ar half-lives, only the $^{24}$Na and $BG_{Cold}$ are left.

IV. Data Reduction

The sample data and calculations in this discussion of the experimental procedure are all from the Ann. γ data from Sample E, Run 3, 27 Nov. 2000. The gamma spectrometer assay allows scheduling of subsequent data collections needed to strip the influences of the two long half-life contaminants, $^{24}$Na and $^{41}$Ar.

The assumption is that the rate of decay of the activity in the fullerene sample after 540 minutes is due entirely to the cold reactor background, $BG_{Cold}$, and to $^{24}$Na decay. The assumption is that all $^{41}$Ar as well as all shorter half-life emitters in the fullerene sample have decayed to background at this time. At 540 minutes, this process requires a measurement of the decay rate of the fullerene sample. The decay rate in Sample E is collected by measuring the number of 511 KeV Ann. γ events, ΔN, in a finite time, Δt, centered on the scheduled measurement time, $t_m$ or 540 minutes. In this experiment, ΔN was the number of 511 KeV Ann. γ events occurring from 530 minutes until 550 minutes after t=0.

Since this was the only decay rate measurement needed in this experiment subsequent to the "first hour" data, the fullerene sample was removed from the gamma spectrometer and $BG_{Cold}$ was measured similarly to the decay rate of $^{24}$Na.

The following expression calculates the rate of accumulation of 511 KeV Ann. γ events due to the decay of $^{24}$Na at 540 minutes:

$$(dN_{Calc.}/dt)_{t=t_m} = \Delta N/\Delta t - BG_{Cold} \quad (1)$$

This expression defines the rate of accumulation of $^{24}$Na decay events at 540 minutes. A handbook or the National Nuclear Data Center website provides the half-life of $^{24}$Na, as well as all other activated species. The exponential decay function provides the rate of accumulation of $^{24}$Na decay events at any time, t after $t_{Obs.}$.

$$(dN_{Calc.}/dt)_{t=t_m} = -(dN_{Na}/dt)_{t=t_{Obs.}} \cdot \exp[-\ln(2) \cdot (t_m - t_{Obs.})/t_{1/2}] \quad (2)$$

Rearranging the terms and combining Eqs. (1) and (2) yields an equation for the initial intensity of $^{24}$Na decay at t=$t_{Obs.}$:

$$(dN_{Na}/dt)_{t=t_{Obs.}} = -\frac{\Delta N/\Delta t - BG_{Cold}}{\exp[-\ln(2) \cdot (t_m - t_{Obs.})/t_{1/2}]} \quad (3)$$

The integral of Eq. (2), when the initial value of $N_{Calc.}$ is assumed to be zero at t=$t_{Obs.}$, gives the value $N_{Calc.}$ at any time, t:

$$N_{Calc.} = -\frac{(dN_{Na}/dt)_{t=t_{Obs.}}}{[-\ln(2)/t_{1/2}]} \cdot \{1 - \exp[-\ln(2) \cdot (t - t_{Obs.})/t_{1/2}]\} \quad (4)$$

Combining Eqs. (3) and (4) yields an expression for $N_{Calc.}$ at any time, t after $t_{Obs.}$, that is entirely in terms of the subsequent data measurement scheduled by the results of the gamma spectrometer, the cold background gamma activity, $BG_{Cold}$, and data available in handbooks:

$$N_{Calc.} = \frac{\Delta N/\Delta t - BG_{Cold}}{[\ln(2)/t_{1/2}] \cdot \exp[-\ln(2) \cdot (t_m - t_{Obs.})/t_{1/2}]} \cdot \{1 - \exp[-\ln(2) \cdot (t - t_{Obs.})/t_{1/2}]\} \quad (5)$$

Equation (5) is the contribution of $^{24}$Na to the first hour time history of 511 KeV Ann. γ events. The number of $^{24}$Na events, $N_{Calc.}$, at each time step in the first hour time history may be calculated and subtracted from the total. Data needed to calculate $BG_{Hot}$ are collected while the fullerene sample is in the reactor. The calculation of $BG_{Hot}$ is the same as the calculation of $BG_{Cold}$. Multiplying $BG_{Hot}$ by the length of a time step in the first hour time history of 511 KeV Ann. γ events and subtracting the product from each data point removes the contribution of hot background events from the first hour time history.

In cases where there are two or more sets of subsequent data collections, as determined by the results of the gamma spectrometer assay of the irradiated fullerene sample, the process applies a similar process sequentially to each set of subsequent data. It begins with the longest half-life contaminant and works sequentially to the shorter half-life contaminants.

In this example, after removal of the 511 KeV Ann. γ events due to $^{24}$Na decay, the last remaining contaminant with a half-life longer than 51.25 minutes is the $^{41}$Ar in the fullerene sample. The removal of 511 KeV Ann. γ events due to the last long-life contaminant, $^{41}$Ar in this example, proceeds by a slightly different process than the removal of other long half-life contaminants.

There is no need to schedule a subsequent data collection for this remaining contaminant. An assumption, stated earlier, is that any trapped neutrons or antineutrons all effectively decay out of the fullerenes by t=51.25 minutes. This assumption permits the calculation of $N_{Calc.}$ for the $^{41}$Ar contaminant directly from the first hour time history of 511 KeV Ann. γ events. ΔN is simply the sum of the remaining gamma events recorded after 51.25 minutes. Remember, all of the other events from the background activity and the other contaminants are already gone. Equation (5) becomes:

$$N_{Calc.} = \frac{\Delta N/(60-51.25)}{[\ln(2)/t_{1/2}] \cdot \exp\{-\ln(2) \cdot [(60-51.25)/2]/t_{1/2}\}} \cdot \{1-\exp[-\ln(2) \cdot (t-t_{Obs.})/t_{1/2}]\} \quad (6)$$

Equation (5) is normalized by dividing it by the value of $N_{Calc.}$ at t=60. Equation (7) calculates the theoretical normalized data in FIGS. 3 and 4 at each time, t, where $t_{Obs.}$<t<60.

$$N_{NCalc.} = \frac{1-\exp[-\ln(2) \cdot (t-t_{Obs.})/t_{1/2}]}{1-\exp[-\ln(2) \cdot (60-t_{Obs.})/t_{1/2}]} \quad (7)$$

Figure 2:
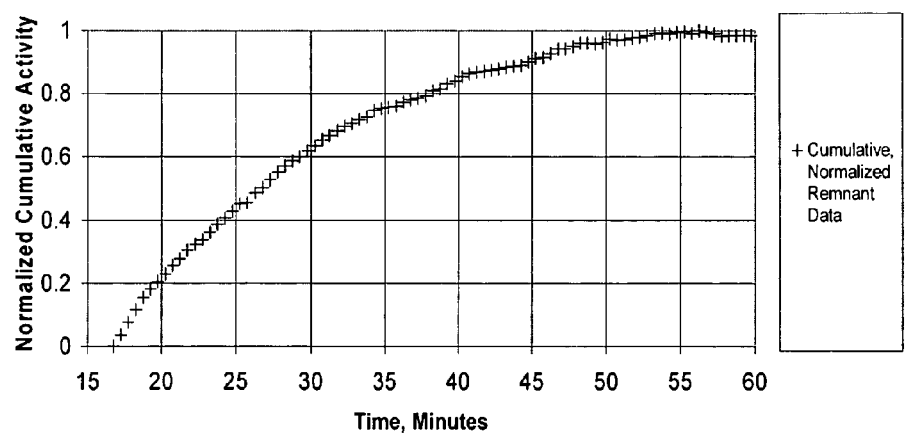
FIG. 2 is a graphic of normalized, integrated "remnant" data left after all events due to contaminants and background activities have been removed from the first hour time history of normalized, integrated 511 KeV Ann. γ events recorded after the sample left the neutron flux.

After the subtraction of the $^{41}$Ar contribution to the first hour time history of 511 KeV Ann. γ events, there should be no 511 KeV Ann. γ events left in the data set. The process has eliminated all identifiable sources of 511 KeV Ann. γ event data from the first hour time history. As FIG. 2 illustrates, data are left.

Figure 3:
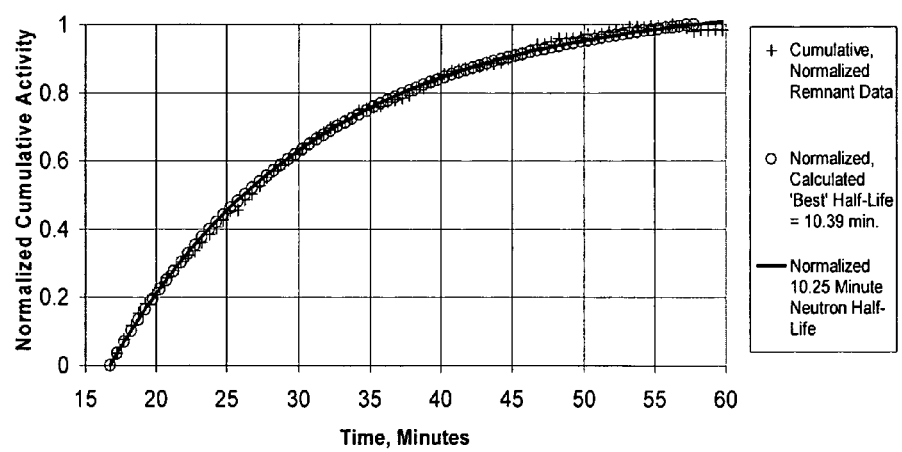
FIG. 3 is a comparison of the normalized, integrated remnant data from FIG. 2 compared to the 10.39-minute half-life "best" curve fit normalized, integrated, exponential, decay curve and the 10.25-minute normalized, integrated, exponential, decay curve of free antineutrons.

These remnant data have a half-life that is close, at 10.39 minutes, to the accepted half-life of free neutrons and, presumably antineutrons, e.g., 10.25 minutes. FIG. 3. shows the close agreement between the accepted 10.25-minute cumulative decay curve and the data generated in this experiment.

The gamma spectrometer at Ohio State can detect all gamma ray-emitting atomic species produced by neutron activation in the reactor at Ohio State. The gamma spectrometer detects 511 KeV Ann. γ. emissions with a half-life near 10.25-minutes. The gamma spectrometer does not detect any atomic specie that can produce such emissions. These remnant emissions completely conform to what the gamma spectrometer would detect if the remnant emissions were a result of the decay of antineutrons.

Figure 4:
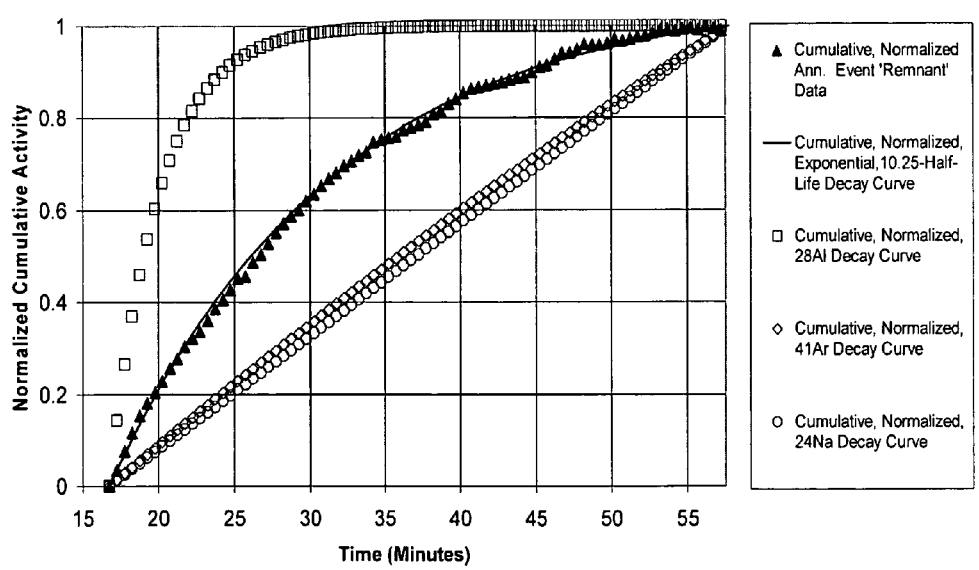
FIG. 4 is a comparison of the normalized, cumulative remnant data from FIG. 2 compared to the 10.25-minute normalized, integrated, exponential, decay curve of free antineutrons. The decay curves of the three contaminants in the fullerene sample are also plotted on the same chart to show that there is no confusion between the remnant data and the decay of the detected contaminants.

FIG. 4. shows a comparison of the measured remnant data, the 10.25-minute half-life, and the detected contaminants when plotted as normalized, cumulative decay.

The applicants emphasize that the detected remnant data represents the majority of the detected 511 KeV Ann. γ events in the unreduced raw data. Trace data are not the basis for these results. Commercially available fullerenes yield these results. No extraordinary processing of the fullerenes is required to obtain these data. This experiment used fullerenes that were very clean but they were ordered from MER Corporation's product catalog.

The conclusion is that the remnant emissions are due to the decay of antineutrons. This conclusion supports the assertion that the invention in this disclosure produces antineutrons by neutron-antineutron oscillation. Since antiprotons are a decay daughter of antineutrons, an unstable particle, the invention must also produce antiprotons.

Independent Experimental Confirmation

Figure 8:
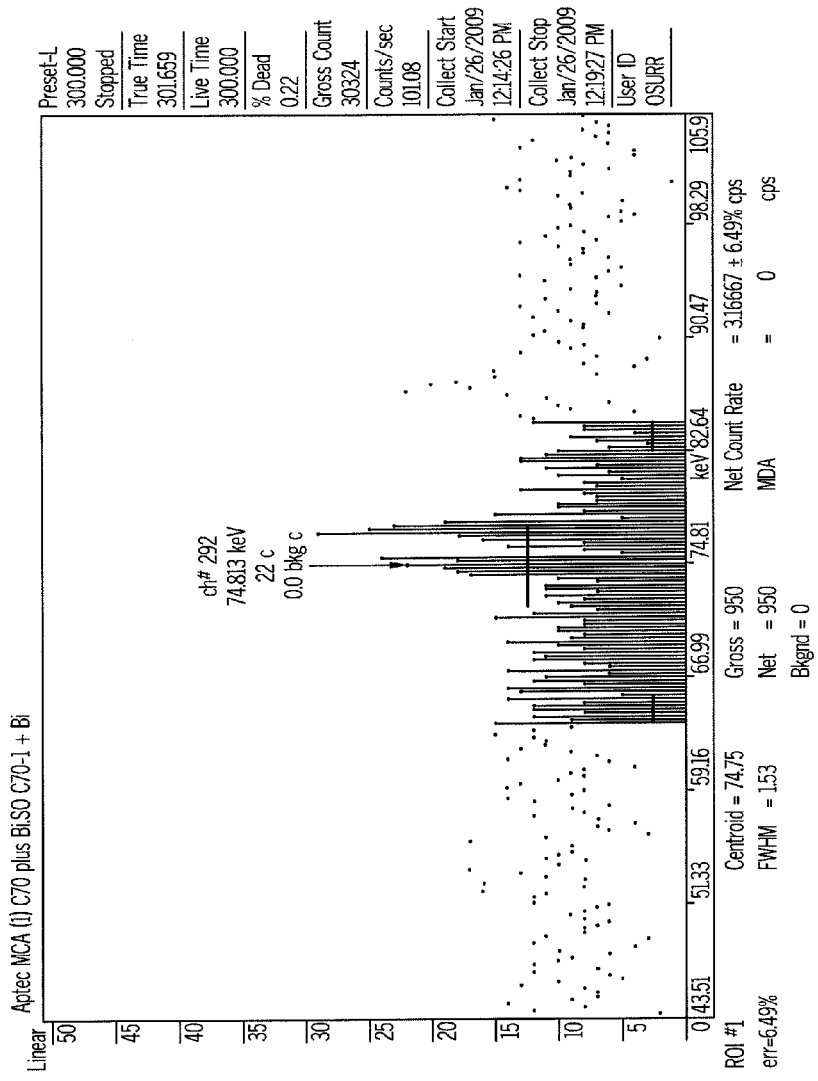
FIG. 8 is an X-ray cascade spectrum of the irradiated $C_{70}$ fullerene sample of FIG. 7 with $^{209}$Bi powder mixed into the sample.
Figure 10:
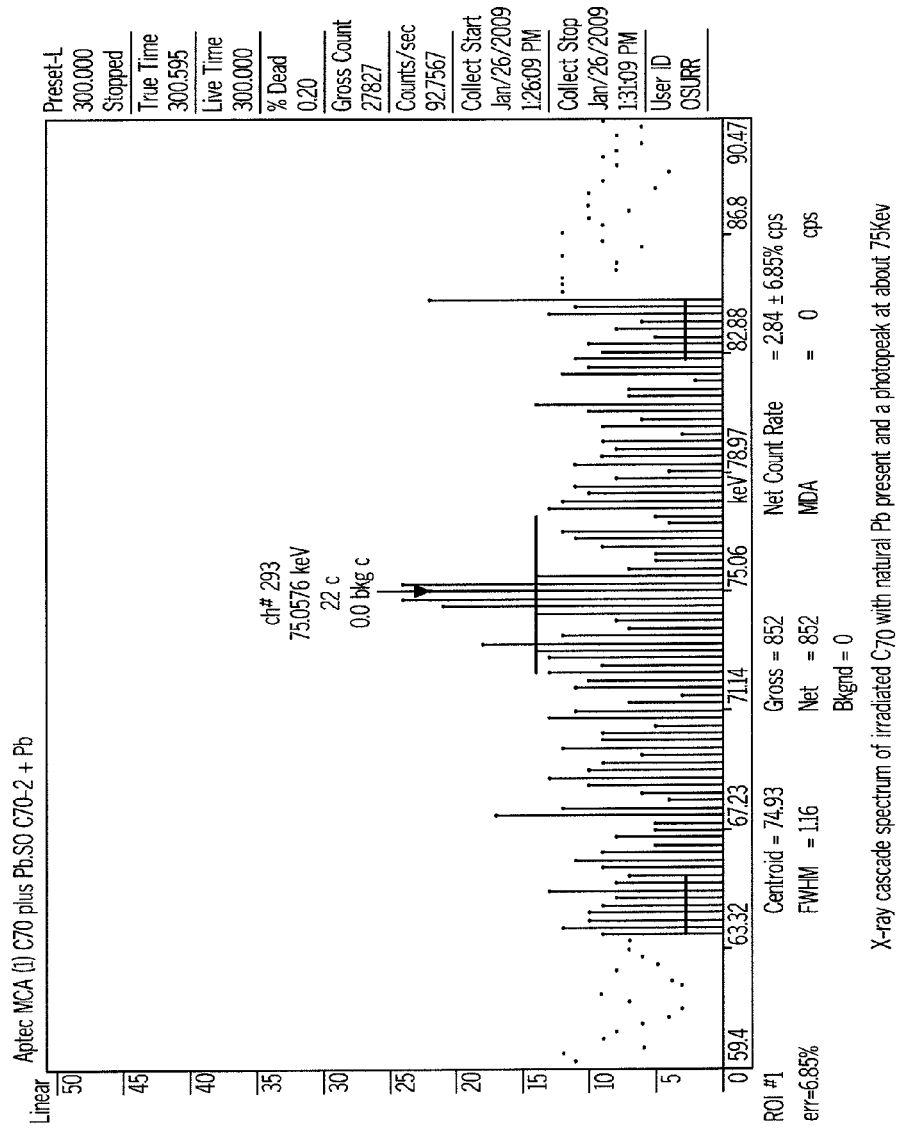
FIG. 10 is an X-ray cascade spectrum of the irradiated $C_{70}$ fullerene sample of FIG. 9 with natural lead powder mixed into the sample.

Antiprotons are released from the $C_{70}$ fullerenes as shown by the appearance of a photopeak at 75 KeV in the X-ray cascade spectra of $C_{70}$ fullerenes in the presence of inert bismuth, see FIG. 8, and in the presence of inert lead, see FIG. 10. The significance of the 75 KeV photopeak is explained below.

The annihilation of antiprotons with the nuclei of atoms produces a complex series of gamma emissions. Most of these emissions are very energetic and, as a result of their high energy, typically above the limit of sensitivity of the gamma spectrometer at the Ohio State Reactor Laboratory. However, the x-ray cascade spectra of heavier elements do lie within the sensitivity range of the gamma spectrometer at the Ohio State Reactor Laboratory, for example lead and bismuth.

The European CERN organization created a considerable body of literature on the subjects of low-energy antiprotons, antiprotonic atoms, and x-ray cascade spectra at the Low Energy Antiproton Ring (LEAR) experiment. Reference 18 provides background information on this relatively obscure branch of physics. Applicants note that the creation of x-ray cascades typically requires very complex and expensive equipment such as the CERN LEAR experiment.

One series of gamma emissions that is associated with reactions between antiprotons and atoms is the so-called "antiprotonic atom x-ray (or weak γ-ray) cascade" emissions associated with "antiprotonic" atoms. An antiprotonic atom occurs as a precursor to the annihilation of a low-energy antiproton in an atomic nucleus. The charge on an antiproton is the same as the charge on an electron. When a low-energy antiproton encounters an atom, it behaves analogously to a "heavy" electron. The antiproton enters the electron orbitals of the atom. This configuration of an atom with an antiproton in its electron orbitals is called an antiprotonic atom.[19]

Figure 5:
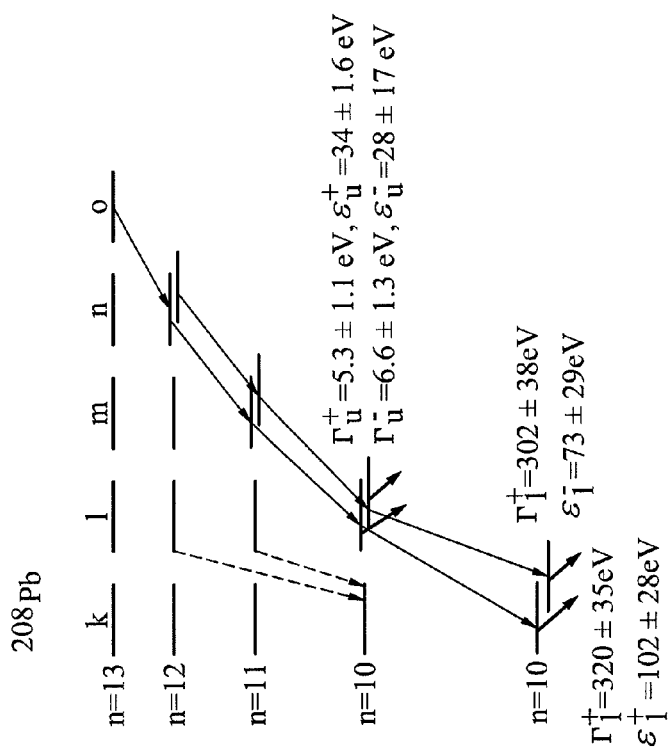
FIG. 5 is a graphic of the cascade of antiprotons down the orbitals of $^{208}$Pb.
Figure 6:
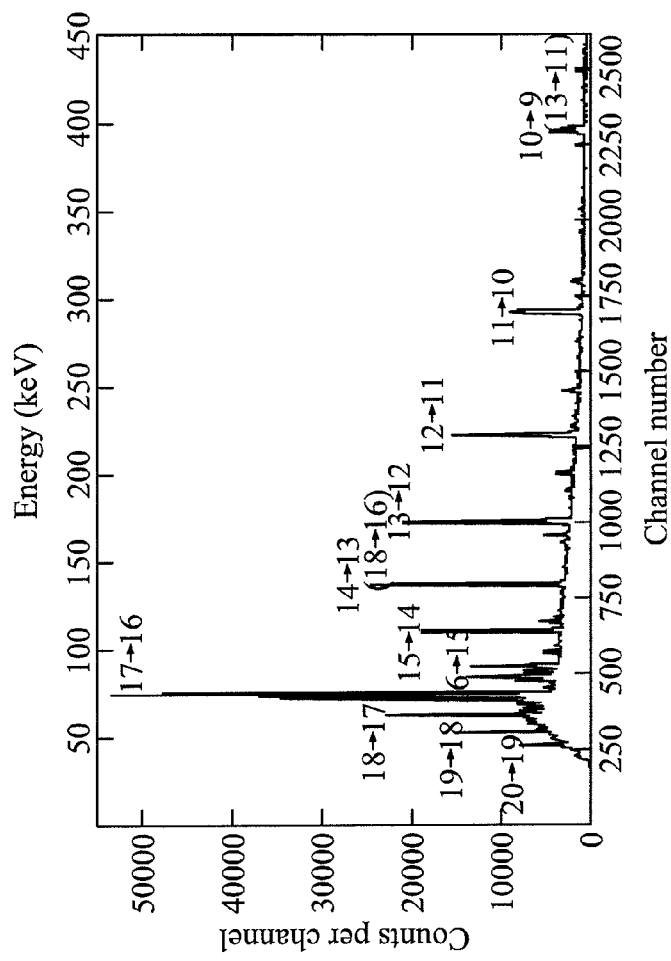
FIG. 6 is an antiprotonic X-ray spectrum of $^{208}$Pb having a peak at about 75 Kev.

Antiprotonic atoms are not a stable configuration of matter. The antiproton rapidly drops from an initial high-energy orbital to successively lower energy orbitals until it reaches the nucleus of the atom, as illustrated in FIG. 5 reproduced from Klos[19], and annihilates within the nucleus. Each step on the "cascade" down the orbitals of the atom emits a specific strong x-ray photon. The sum of all of these emitted photons is called an x-ray cascade spectrum even when it includes weak γ-rays. Each atomic specie has a unique x-ray cascade spectrum. For example, the x-ray cascade spectrum of antiprotonic $^{208}$Pb shown in FIG. 6 (reproduced from Klos[19]) with a peak at about 75 Kev is produced by exposing a sample of pure isotope $^{208}$Pb to low energy antiprotons.

Although each antiprotonic x-ray cascade is unique to the atomic specie that emits it, all antiprotonic x-ray cascades have some similar features. A typical antiprotonic x-ray cascade is represented by a series of grouped emission lines with the intensity of the emission line decreasing with increasing energy levels. The exact configuration of any antiprotonic x-ray cascade depends only on the A, atomic weight, and N, atomic number, of the specie that emits the cascade.

Two species with roughly similar A and N will have roughly similar antiprotonic x-ray cascades.[19] Natural lead has an average A of about 207.2 amu and an N of 82. $^{209}$Bi has an A of 209 and an N of 83. The antiprotonic x-ray cascades of both natural lead and $^{209}$Bi should be very similar to $^{208}$Pb which has an A of 208 amu and an N of 82. Klos[19], in fact, contains a detailed discussion of the similarities between the antiprotonic x-ray cascades of $^{208}$Pb and $^{209}$Bi.

Accordingly, antiprotons produced from the inventive fullerenes containing entrapped neutrons, described herein, will also cascade down the electron oribitals of lead and/or bismuth to produce a unique spectrum having a peak at about 75 KeV. The process used to produce the x-ray cascade spectra of FIGS. 7-10 include: obtaining a sample of fullerene; obtaining a specie capable of producing an photopeak in a gamma spectrum in response to antiprotons that is detectable by the Ohio State gamma spectrometer; irradiating the fullerene sample with free neutrons in a nuclear reactor; removing the fullerene sample from the reactor flux; collecting a first gamma spectrum; mixing a sample of the specie with the irradiated fullerene sample; and collecting a second gamma spectrum.

The fullerene sample may be a 100 mg sample of $C_{60}$ or $C_{70}$ fullerene. The reactor used for irradiating the fullerene sample may be set at 450 Kw for 15 minutes and may be similar to the reactor available at the Ohio State Reactor Laboratory. The specie may be bismuth powder (e.g., $^{209}Bi$) or lead powder (e.g., natural lead or pure isotope $^{208}Pb$). The spectra may be measured with a gamma spectrometer for about 300-seconds.

In one embodiment, $^{209}Bi$ powder was used because it has a relatively high-energy x-ray cascade and Klos[19] teaches that $^{209}Bi$'s x-ray cascade spectra will approximate the x-ray cascade spectrum of $^{208}Pb$. Klos[19] teaches that a pure isotope of $^{208}Pb$ has a known antiprotonic x-ray cascade spectrum, that would make the $^{208}Pb$ useful in the process above, but to applicants' knowledge it is not commercially available without the appropriate NRC license. Other metals and metal isotopes may be used, however, their x-ray cascade spectra will need to be known or approximated from another specie that behaves similarly to identify the photopeak(s) corresponding to the presence of an antiproton. LEAR has generated x-ray cascade spectra for over 100 isotopes that when published may have high enough energy x-ray cascades to be useful to identify photopeaks that correspond to exposure to antiprotons.

Figure 7:
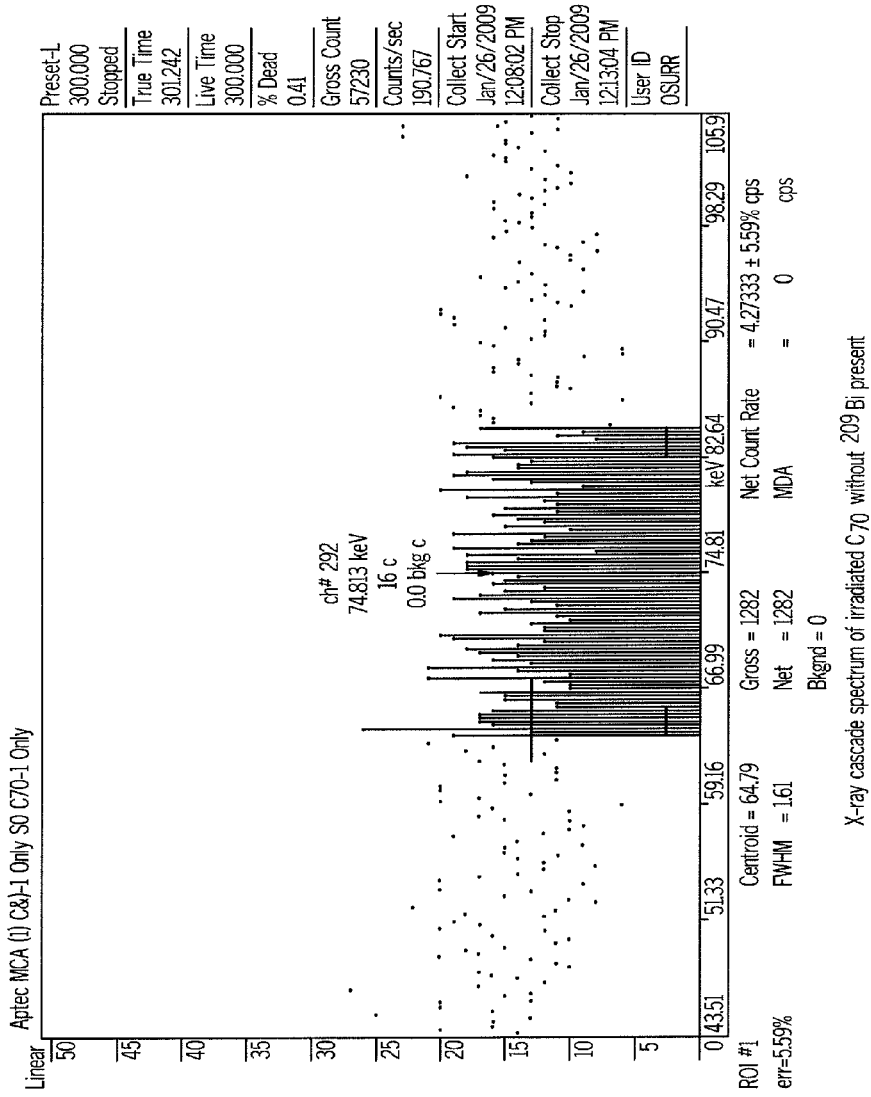
FIG. 7 is an X-ray cascade spectrum of an irradiated $C_{70}$ fullerene sample without bismuth present.

A first 300-second spectrum of a 100 mg irradiated $C_{70}$ fullerene sample (i.e., without $^{209}Bi$ present) is shown in FIG. 7. This sample was irradiated in the reactor at the Ohio State Reactor Laboratory at 450 Kw for 15 minutes, was removed and transferred to a clean, unirradiated sample vial for the first 300-second spectrum to be collected. After collecting the first 300-second spectrum, the 100 mg irradiated $C_{70}$ fullerene sample was mixed with about an equal volume of $^{209}Bi$ powder and placed immediately back into the gamma spectrometer for a second 300-second spectrum. The 209Bi is not irradiated by anything other than emissions from the previously irradiated fullerene sample itself. The second 300-second spectrum is shown in FIG. 8. With the $^{209}Bi$ present, a photopeak appears at about 75 KeV as expected when bismuth is exposed to antiprotons.

Figure 9:
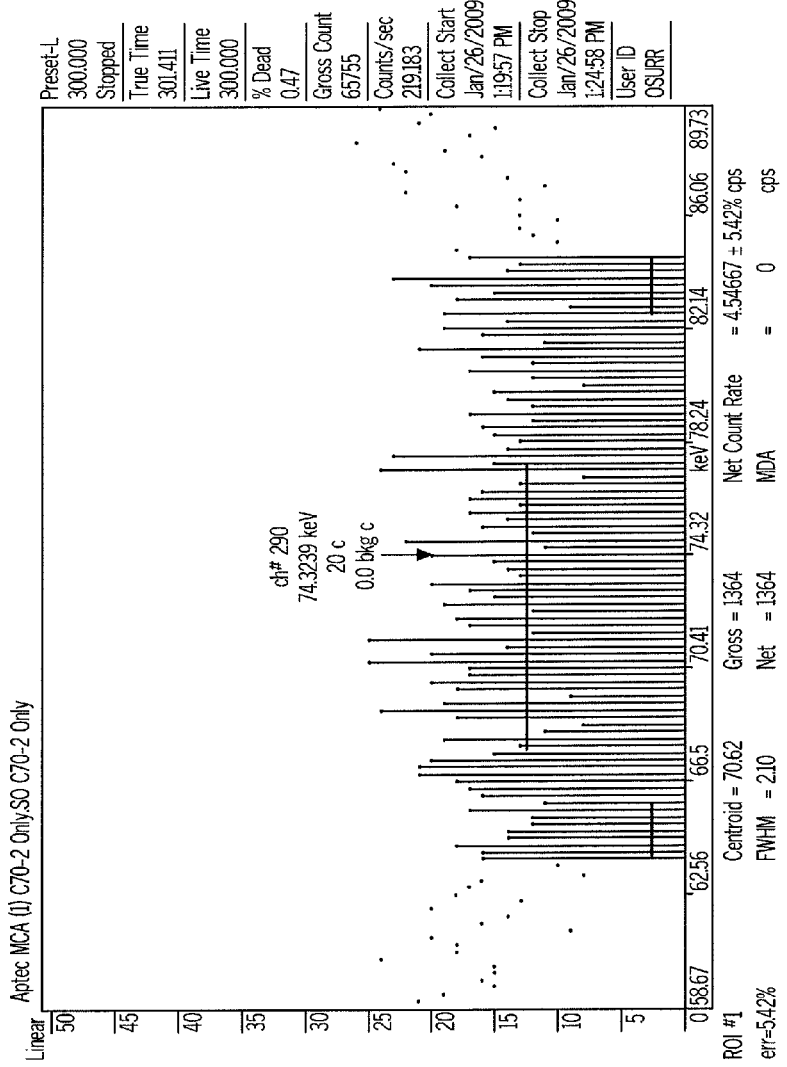
FIG. 9 is an X-ray cascade spectrum of an irradiated $C_{70}$ fullerene sample without natural lead powder present.

In another embodiment, natural Pb powder was used rather than the bismuth. A first 300-second spectrum of a 100 mg irradiated $C_{70}$ fullerene sample (i.e., without Pb present) is shown in FIG. 9. This sample was irradiated in the reactor at the Ohio State Reactor Laboratory at 450 Kw for 15 minutes, was removed and transferred to a clean, unirradiated sample vial for the first 300-second spectrum to be collected. After collecting the first 300-second spectrum, the 100 mg irradiated $C_{70}$ fullerene sample was mixed with about an equal volume of natural lead powder and placed immediately back into the gamma spectrometer for a second 300-second spectrum. The natural lead is not irradiated by anything other than emissions from the previously irradiated fullerene sample itself. The second 300-second spectrum is shown in FIG. 10. Even with natural lead powder rather than the $^{208}Pb$ isotope tested in Klos[19], a photopeak still appears at about 75 KeV as expected when lead is exposed to antiprotons.

This new process for detecting the 75 KeV photopeak for the presence of antiprotons is first introduced in this application, but antiprotons were present in the data submitted in Applicants' related earlier applications. The older data was just not analyzed in the manner disclosed above to yield 75 KeV photopeaks. However, looking at the older data some x-ray cascades are present, but were ignored. Furthermore, efforts were made to keep the samples pure, which likely only allowed the antiprotons in the fullerene samples to encounter $^1H$, $^{12}C$, $^{14}N$, and $^{16}O$. X-ray cascade spectra are available for hydrogen, nitrogen and oxygen and upon reexamination of the older data in view of these X-ray cascade spectra, a few of the highest-energy photopeaks were present.

Applications

Current art does not enable controlled production of antineutrons in predictable quantities. They remain exotic particles observed, occasionally and indirectly, in reactions in particle accelerators. The invention in this disclosure enables a controlled process that produces significant quantities of antineutrons.

This invention also enables the formation of a controlled beam of antiprotons at a uniform and arbitrary energy. This invention also enables a mixed beam of neutrons and antineutrons at a uniform and arbitrary energy.

This invention enables direct confirmation that the half-lives of antineutrons and neutrons are identical. At present, it is only an accepted assumption that the half-lives are identical. The process can also produce antineutrons in quantities that are significant to engineering.

Current art enables the controlled production of antiprotons in significant quantities. Only a few large particle accelerators have ever done this before now. Presently, only CERN and Fermi lab produce antiprotons in quantity.

This invention can change this situation significantly. It enables production of antiprotons at any location where a neutron flux is available. This includes but is not limited to most of the world's research reactors. The cost of production will be little more than the cost of operating the reactor.

The annihilation of protons and antiprotons represents the most concentrated form of energy known to exist. The annihilation of a proton and an antiproton converts 100% of the mass of the two particles into energy. The ability to produce antiprotons inexpensively and in significant quantities makes this energy available for engineering purposes.

The late Doctor Robert L. Forward published extensively on the technologies that plentiful and inexpensive antiprotons would enable. His book *Mirror Matter*[15] summarizes many of his previous publications.

Among these are new diagnostic and treatments in medicine. A beam of antiprotons can do many of the tasks now performed by MRI, PET, and X-ray machines. The same beam that detects diseased tissue may also treat it. This radiation treatment is controllable so that there is no injury to healthy tissue. Present radiation treatments cannot do this.

Similarly, a beam of antiprotons can perform as a tool for detecting flaws in materials. Not only can it detect a flaw or contaminant in parent material, it can repair some of them. As in the medical application, antiprotons can perform this repair without causing any additional damage.

The discovery[13,14] in 1991 that antiprotons catalyze nuclear fission reactions far more efficiently and in far more nuclei than neutrons is another property of antiprotons that no one has explored completely. Neutrons only catalyze fission in three very rare or manmade nuclei, $^{233}U$, $^{235}U$, and $^{239}Pu$. Antiprotons can catalyze fission in many common, naturally occurring, non-radioactive nuclei. Antiproton catalyzed fission produces many more neutrons and may release more energy than neutron-catalyzed fission.

One application of antiproton-catalyzed fission that has received significant research effort is propulsion. Antiprotons provide a variety of propulsion options for vehicles as diverse as submarines, aircraft, and spacecraft. The potential power or thrust per pound is literally many orders of magnitude greater than current art chemical propellants and even current art nuclear propulsion technology can deliver. This is especially true when antiproton catalyzed fission is used to initiate thermonuclear reactions. Dr. Forward[15] covers some of these applications in his book. The American Institute of Aeronautics and Astronautics publication *Fusion Energy in Space Propulsion*[16] also covers this subject in detail.

A recent newspaper article[17] discuss a new solid-state means of producing neutrons using a special chip. This may provide an alternative source of neutrons and, when coupled to this invention, provide the means to generate antiprotons and antineutrons at locations remote from nuclear reactors.

This invention also enables a new science of nuclear fission and fusion reactions catalyzed by antineutron reactions.

REFERENCES

[1] V. K. Ignatovich translated by G. B. Pontecorvo, *The Physics of Ultracold Neutrons*, Clarendon Press, Oxford U. K, 1990, pp. 304-305, ISBN 0-19-851015-2.

[2] R. Golub, D. Richardson, and S. K. Lamoreaux, *Ultra-cold Neutrons*, Adam Hilger IOP Publishing Ltd., 1991 p. 216, ISBN 0-7503-0115-5.

[3] V. K. Ignatovich translated by G. B. Pontecorvo, *The Physics of Ultracold Neutrons*, Clarendon Press, Oxford U. K, 1990, pp. 1-33, ISBN 0-19-851015-2.

[4] R. Golub, D. Richardson, and S. K. Lamoreaux, *Ultra-cold Neutrons*, Adam Hilger IOP Publishing Ltd., 1991 pp. 19-31, ISBN 0-7503-0115-5.

[5] Yu. Yu. Kosvintsev, Yu. A. Kushnir, V. I. Morozov, and G. I. Terekhov, "Possible Use of Wall Traps and Magnetic Traps of Ultra-Cold Neutrons for Measuring the lifetime of the Free Neutron", translated from *Pribory I Tekhnika Eksperimenta (Instruments and Experimental Techniques)*, Vol. 20, No. 1, Pt. 1, January-February 1977, pp. 43-45.

[6] Ch. Niedermayer, I. D. Reid, E. Roduner, E. J. Ansaldo, C. Bernhard, U. Binninger, H. Glückler, E. Recknagel, J. I. Budnick, and A. Weidinger, "Simultaneous Observation of Muonium and Multiple Free Radicals in Muon-implanted $C_{70}$," *Physics Review B*, Vol. 47, No. 16, 15 Apr. 1993, p. 10,923.

[7] P. W. Percival and S. Wlodek, "The Structure of $C_{60}Mu$ and other Fullerenyl Radicals," *Chemical Physics Letter, Vol.* 196, No. 3, 4, 14 Aug. 1992, p. 317.

[8] S. K. Estreicher, C. D. Latham, M. I. Heggie, R. Jones, and S. Oberg, "Stable and Metastable States of $C_{60}H$: Buckminsterfullerene Monohydride," *Chemical Physics Letters*, Vol. 196, No. 3, 4, 14 Aug. 1992, p. 311.

[9] H. A. Jimenez-Vasquez, R. J. Cross, M. Saunders, and R. J. Poreda, "Hot-atom Incorporation of Tritium Atoms into Fullerenes," *Chemical Physics Letters*, Vol. 229, 21 Oct. 1994, pp. 111-114.

[10] P. R. Huffman, C. R. Brome, J. S. Butterworth, K. J. Coakley, M. S. Dewey, S. N. Dzhosyuk, R. Golub, G. L. Greene, K. Habicht, S. K. Lamoreaux, C. E. H. Mattoni, D. N. McKinsey, F. E. Wietfeldt, and J. M. Doyle, "Magnetic Trapping of Neutrons,", *Nature*, Vol. 403, 6 Jan. 2000, pp. 62-64.

[11] Miloslav Rakovic translated by D. Cohen, *Activation Analysis*, CRC Press, 1970; pp 191-194, Library of Congress Catalog Number 71-107282.

[12] William S. Lyon—editor, *Guide to Activation Analysis*, D. Van Nostrand Company, Inc., Princeton, N.J., 1964, pp. 131-133, Library of Congress Catalog Number 64-23964.

[13] R. A. Lewis, R. Newton, G. A. Smith, and R. J. Kanzleiter "Antiproton-Boosted Microfission," *Nuclear Science and Engineering*, Vol. 109, December 1991, pp. 411-415.

[14] B. Chen, et al, "Neutron Yields and Angular Distributions Produced in Antiproton Annihilation at Rest in Uranium," *Physical Review C*, Vol. 45, May 1992, pp. 2332-2337.

[15] Robert L. Forward, Ph.D. and Joel Davis, *Mirror Matter Pioneering Antimatter Physics*, John Wiley & Sons, Inc., 1988, ISBN 0-471-62812-3.

[16] Terry Kammash—editor, *Fusion Energy in Space Propulsion*, American Institute of Aeronautics and Astronautics, 1995, ISBN 1-56347-184-1.

[17] Dan Vergano, "Gee-whiz nuclear-fusion gadget surprises Scientists with its simplicity," USA Today article, p. 8D, 28 Apr. 2005.

[18] Ugo Gastaldi and Robert Klapisch—editors, *Physics at Lear with Low-Energy Cooled Antiprotons*, Plenum Press, 1984, ISBN 0-306-41384-1.

[19] B. Klos, A Trzcińska, J. Jastrzebski, T. Czosnyka, M. Kisieliński, P. Lubiński, P. Napiorkowski, L. Pieńkowsji, F. J. Hartmann, B. Ketzer, P. Ring, R. Schmidt, T. von Egidy, R. Smolańczuk, S. Wycech, K. Gulda, W. Kurewicz, E. Widmann, B. A. Brown, "Neutron density distribution from antiprotonic $^{208}Pb$ and $^{209}Bi$ Atoms," *Physical Review C*, Vol. 76, 25 Jul. 2007, pp. 04311-014323.

Having described the invention in detail and by reference to specific embodiments thereof, it will be apparent that numerous modifications and variations are possible without departing from the spirit and scope of the invention.

What is claimed is:

1. A method for obtaining free thermal antineutrons within the cage-like structure of a fullerene molecule comprising:
   irradiating a fullerene molecule sample containing the fullerene molecule with free thermal neutrons in a high flux location within a nuclear reactor such that the free thermal neutrons are trapped within the fullerene molecule;
   wherein, at room temperature, the trapped free thermal neutrons oscillate between the neutron and antineutron states, which is detectable by the electron-positron annihilation gamma radiation.

2. The method of claim 1 wherein said fullerene molecule is a $C_{60}$ or $C_{70}$ fullerene molecule.

3. The method of claim 2 wherein said fullerene molecule is a $C_{70}$ fullerene molecule.

4. The method of claim 1 wherein said method further comprises detecting the neutron and antineutron states by the steps of:
   (1) measuring the 511 KeV electron-positron annihilation gamma radiation background event rate with a high-resolution gamma spectroscope while irradiating the fullerene molecule to obtain a "hot background" radiation rate for subsequent data reduction calculations;
   (2) withdrawing the fullerene molecule sample from the nuclear reactor and performing a gamma spectrographic analysis on said fullerene sample using the same high-resolution gamma spectroscope as step (1), within about 11.25 minutes after the sample is withdrawn from the nuclear reactor;
   (3) measuring the cumulative 511 KeV electron-positron annihilation gamma radiation events in said fullerene molecule sample beginning at least 11.25 minutes after step (2);
   (4) measuring the 511 KeV electron-positron annihilation gamma radiation event rate data;
   (5) measuring the background 511 KeV electron-positron annihilation gamma radiation event rate after the removal of the fullerene molecule sample from the high-resolution gamma spectroscope at the end of the experiment to obtain a "cold background" radiation rate;

(6) determining the contribution of each identified contaminant to the cumulative 511 KeV electron-positron annihilation gamma radiation event activity measured during the first hour time history; and (7) subtracting the calculated activity of each contaminant from the cumulative, observed, 511 KeV electron-positron annihilation gamma radiation event data recorded in Step (3).

5. The method of claim 4 wherein said fullerene molecule is a $C_{60}$ fullerene molecule or $C_{70}$ fullerene molecule.

6. The method of claim 5 wherein said fullerene molecule is a $C_{70}$ fullerene molecule.

7. The method of claim 4 wherein said trapped free thermal neutrons when in anti-neutron state have thermal energy of about 0.025 electron volts.

8. A fullerene molecule containing a free thermal antineutron trapped within the cage-like structure of said fullerene molecule.

9. The fullerene molecule of claim 8 wherein said fullerene molecule is a $C_{60}$ or $C_{70}$ fullerene.

10. The fullerene molecule of claim 9 wherein said fullerene molecule is a $C_{70}$ fullerene.

11. The fullerene molecule of claim 8 wherein said trapped free thermal antineutron decays to a positron, and an antiproton.

12. The fullerene molecule of claim 8 where the fullerene molecule also contains trapped free thermal neutrons.

13. The fullerene molecule of claim 8 where the fullerene molecule emits energy associated with the formation or decay of positrons, neutrons, antineutrons, or antiprotons.

14. A method for producing antiprotons comprising:
irradiating a fullerene molecule with free thermal neutrons in a nuclear reactor such that the free thermal neutrons are trapped within the fullerene molecule;
wherein, at room temperature, the trapped free thermal neutrons oscillate between the neutron and antineutron states and in the antineutron state decay and produce antiprotons.

15. A method for producing antiprotonic x-ray cascade spectra comprising:
obtaining a sample of fullerene;
obtaining a specie capable of producing a photopeak in a gamma spectrum in response to antiprotons;
irradiating the fullerene sample with free thermal neutrons such that the free thermal neutrons are trapped within the fullerene molecule;
collecting a first gamma spectrum of the irradiated fullerene;
mixing a sample of the specie with the irradiated fullerene; and followed by collecting second gamma spectra.

16. The method of claim 15 further comprising identifying a photopeak in the second gamma spectra that corresponds to the photopeak of the specie.

17. The method of claim 15 wherein the specie is a metal powder.

18. The method of claim 17 wherein the metal powder is lead or bismuth.

19. The method of claim 15 wherein the fullerene is a $C_{60}$ or a $C_{70}$ fullerene.

20. The method of claim 15 wherein collecting the first and second gamma spectra includes collecting the spectrum for 300 seconds in a gamma spectrometer.

* * * * *